(12) United States Patent
Verduzco

(10) Patent No.: US 12,012,288 B1
(45) Date of Patent: Jun. 18, 2024

(54) CONVEYOR BELT SANITIZER SYSTEM

(71) Applicant: Robert Giovanni Verduzco, Monterey, CA (US)

(72) Inventor: Robert Giovanni Verduzco, Monterey, CA (US)

( * ) Notice: Subject to any disclaimer, the term of this patent is extended or adjusted under 35 U.S.C. 154(b) by 56 days.

(21) Appl. No.: 18/050,764

(22) Filed: Oct. 28, 2022

Related U.S. Application Data

(63) Continuation-in-part of application No. 17/461,490, filed on Aug. 30, 2021.

(60) Provisional application No. 63/071,387, filed on Aug. 28, 2020.

(51) Int. Cl.
*B65G 45/10* (2006.01)

(52) U.S. Cl.
CPC .................................. *B65G 45/10* (2013.01)

(58) Field of Classification Search
None
See application file for complete search history.

(56) References Cited

U.S. PATENT DOCUMENTS

| | | | | |
|---|---|---|---|---|
| 5,263,570 | A  * | 11/1993 | Stonemark | B65G 43/00 |
| | | | | 198/573 |
| 7,638,780 | B2 * | 12/2009 | Kilburn | F26B 3/28 |
| | | | | 118/620 |
| 8,624,203 | B2 * | 1/2014 | Tullo | A61L 2/10 |
| | | | | 250/492.1 |
| 11,174,107 | B2 * | 11/2021 | Ahmed | B65G 15/28 |
| 2010/0183779 | A1 * | 7/2010 | Felix | A23B 7/015 |
| | | | | 426/248 |
| 2018/0110890 | A1 * | 4/2018 | Matsui | A61L 2/10 |
| 2018/0343898 | A1 * | 12/2018 | Alzeer | A61L 2/10 |

* cited by examiner

*Primary Examiner* — Kavel Singh
(74) *Attorney, Agent, or Firm* — Ashkan Najafi

(57) ABSTRACT

A conveyor belt sanitizer system includes a free-standing conveyor belt apparatus having a rotating conveyor belt traveling in a looped path, opaque cases are disposed proximate to and facing an outer surface of the conveyor belt along a hidden return section of the looped path, LEDs are situated in the opaque cases, brackets are connected to opposed longitudinal sides of a first one of the plurality of opaque cases and configured to be mounted to a support surface at the hidden return section of the looped path, and a controller is coupled to the LEDs. The controller is configured to automatically actuate the LEDs between an operating mode and a non-operating mode when the conveyor belt is rotated relative to a stationary position of the opaque cases and further configured to selectively sanitize an outer surface of the conveyor belt.

5 Claims, 16 Drawing Sheets

CONVEYOR BELT SANITIZER SYSTEM

CROSS REFERENCE TO RELATED APPLICATIONS

This is a continuation-in-part (CIP) application that claims priority to and the benefit of co-pending U.S. non-provisional patent application Ser. No. 17/461,490, filed Aug. 30, 2021, which claims priority to and the benefit of U.S. provisional patent application No. 63/071,387 filed Aug. 28, 2020, which are incorporated by reference herein in their entireties.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to sanitizing devices and, more particularly, to a specially designed device for sanitizing conveyor belts.

Prior Art

In general, conveyor belts are used in store checkouts (e.g., grocery stores, home good stores, etc.) and can be a source of contamination of foods or other purchased items, due to the large number items that are in physical contact with the conveyor belt. For example, food products, cleaners, medicines, chemical products may come in contact with the conveyor belt surfaces. Additionally, individuals may touch, sneeze, or cough on the conveyor belt, which may lead to direct exposure to various diseases, germs and other airborne particles. However, the conveyor belt is not easily removed and cleaning is typically not performed on a regular basis. A suitable solution is desired.

Accordingly, a need remains for a device for cleaning and sanitizing conveyor belts in order to overcome at least one of the above-noted shortcomings. The exemplary embodiment(s) satisfy such a need by a conveyor belt sanitizer system that is convenient and easy to use, lightweight yet durable in design, versatile in its applications, and designed to kill bacteria and viruses on conveyor belts.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a conveyor belt sanitizer system. These and other objects, features, and advantages of the non-limiting exemplary embodiment(s) are provided by a conveyor belt sanitizer system including a conveyor belt sanitizer system including a free-standing conveyor belt apparatus having a rotating conveyor belt traveling in a looped path, a plurality of opaque cases having an open top side disposed proximate to and facing an outer surface of the conveyor belt along a hidden return section of the looped path, a plurality of light-emitting diode strips (LEDs) situated in the plurality of opaque cases at the open top side, a plurality of brackets connected to opposed longitudinal sides of a first one of the plurality of opaque cases and configured to be mounted to a support surface at the hidden return section of the looped path, and a controller coupled to the plurality of LEDs. Advantageously, a first one of the plurality of LEDs and the first one of the plurality of opaque cases is statically disposed beneath the rotating conveyor belt and oriented perpendicular to a longitudinal length of the hidden return section of the looped path. Advantageously, a second one of the plurality of LEDs and a second one of the plurality of opaque cases is statically disposed beneath the rotating conveyor belt and oriented parallel to the longitudinal length of the hidden return section of the looped path. Advantageously, the controller is configured to automatically actuate the plurality of LEDs between an operating mode and a non-operating mode when the conveyor belt is rotated relative to a stationary position of the plurality of opaque cases and further configured to selectively sanitize an outer surface of the conveyor belt via the open top side of the plurality of opaque cases. Advantageously, the first one of the plurality of opaque cases is disposed orthogonal to the second one of the plurality of opaque cases.

In a non-limiting exemplary embodiment, the controller is seated entirely within the first one of the opaque cases and includes a printed circuit board (PCB) seated entirely within the controller and including a processor, and a memory in communication with the processor. Such a memory includes software instructions, executable by the processor, for controlling an operating mode of the plurality of LEDs in each of the plurality of opaque cases. Advantageously, at least one sensor is in communication with the processor for detecting motion of the existing conveyor belt, and a switch is in communication with the processor and for controlling operation of the plurality of LEDs in each of the plurality of opaque cases. Thus, when the sensor detects motion of the conveyor belt, the LEDs turn on, and when no motion is detected, the LEDs turn off.

In a non-limiting exemplary embodiment, each of the plurality of opaque cases further includes a U-shaped cross-section and a hollow cavity. The LEDs are seated within the hollow cavity.

In a non-limiting exemplary embodiment, the plurality of brackets are attached to opposed axial ends of the first one of the plurality of the opaque cases and spaced from the second one of the plurality of opaque cases. Advantageously, the second one of the plurality of opaque cases is detachably and operably attached to the first one of the plurality of opaque cases for receiving power in series.

In a non-limiting exemplary embodiment, the second one of the plurality of opaque cases further includes a power cord operably attached to an external power source.

The method further includes the steps of: disposing the open top side of the opaque case proximate to and facing an outer surface of the existing conveyor belt; configuring the controller to automatically actuate the at least one UV light between an operating mode and a non-operating mode when the existing conveyor belt is rotated relative to a stationary position of the opaque case and further configuring the controller to selectively sanitize an outer surface of the existing conveyor belt via the open top side of the opaque case; programming the controller to operate a predetermined time interval after the existing conveyor belt has stopped rotating relative to the opaque case; and repeatedly detaching the opaque case from the outer surface of the existing conveyor belt.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
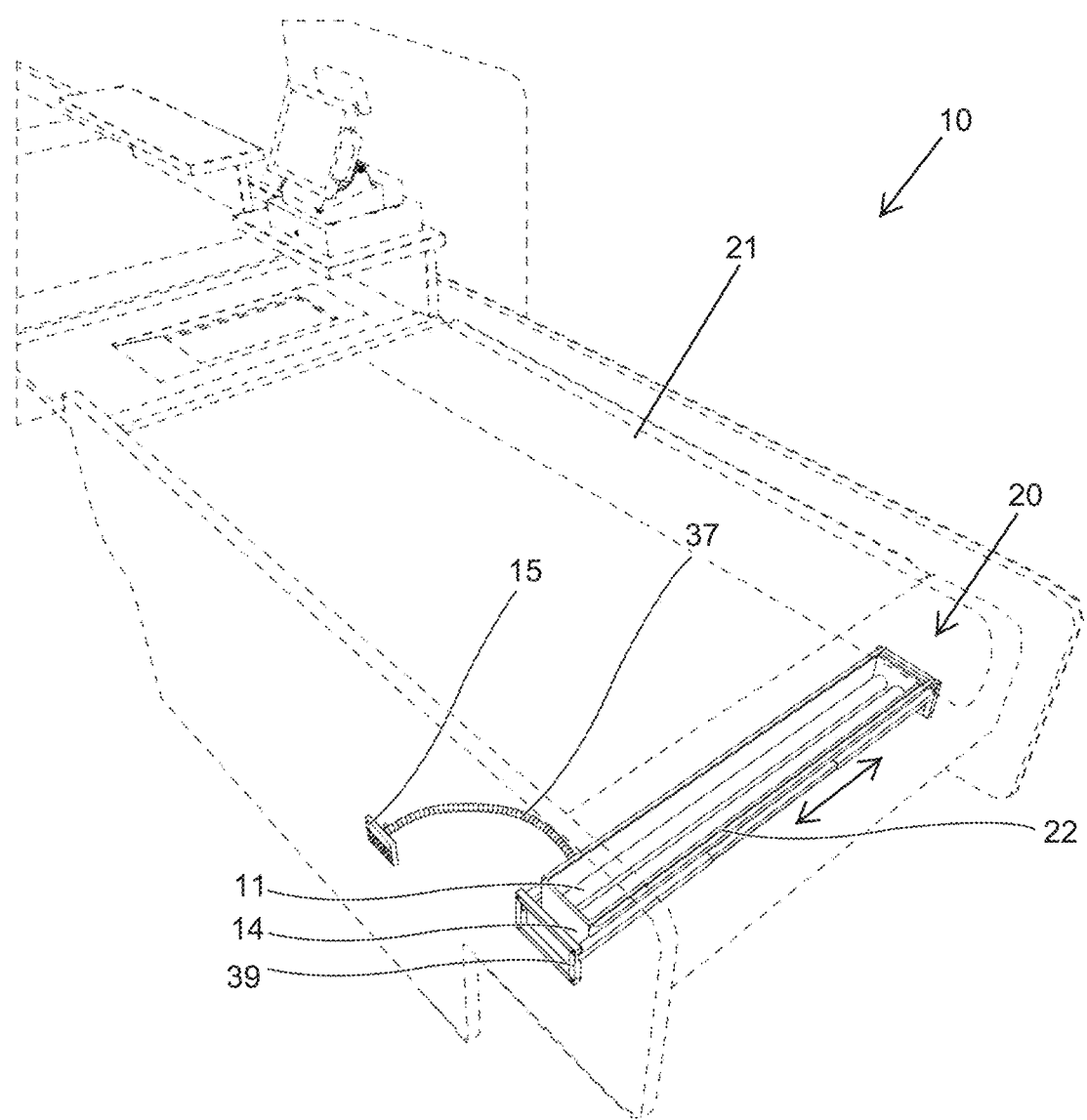
FIG. 1 is a perspective view of a conveyor belt sanitizer system during an installed condition according to an embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

The term "UV light" includes ultra-violet light and/or blue light (HEV light). UV light contains UV-C (100 nm to 280 nm), UV-B (280 nm to 315 nm) and UV-A (315 nm to 400 nm). Blue light, sometimes referred to as high-energy visible (HEV) light, encompasses 400 nm to 500 nm.

Figure 2:
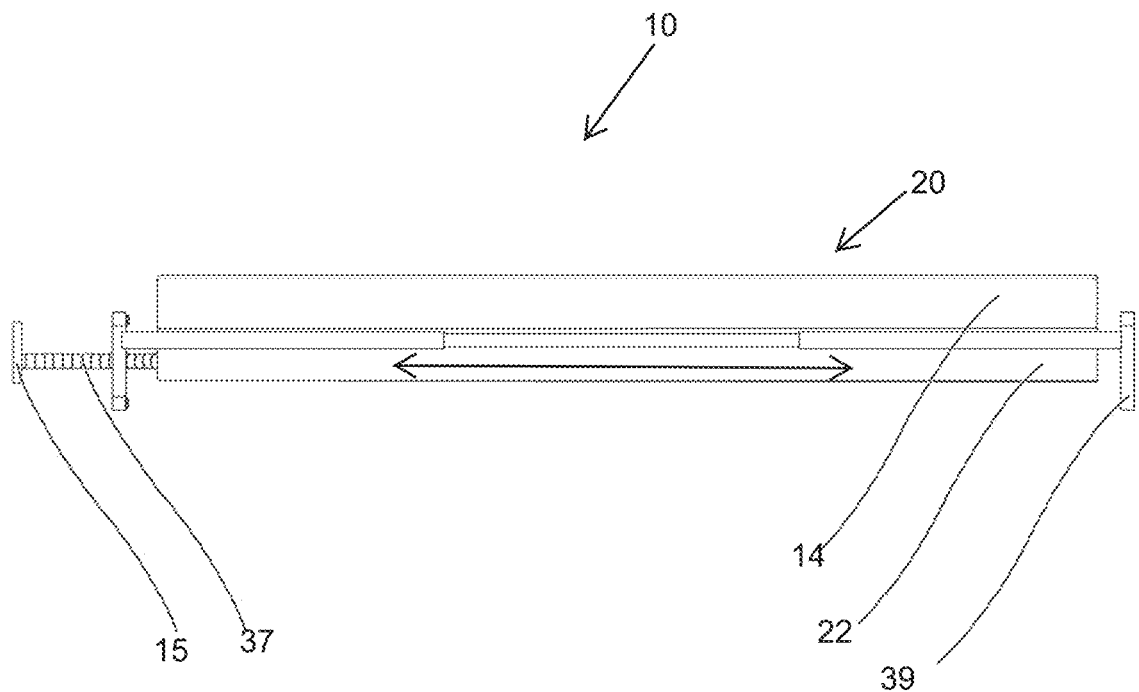
FIG. 2 is a side view illustrating the conveyor belt sanitizer system according to an embodiment of the present disclosure.
Figure 3:
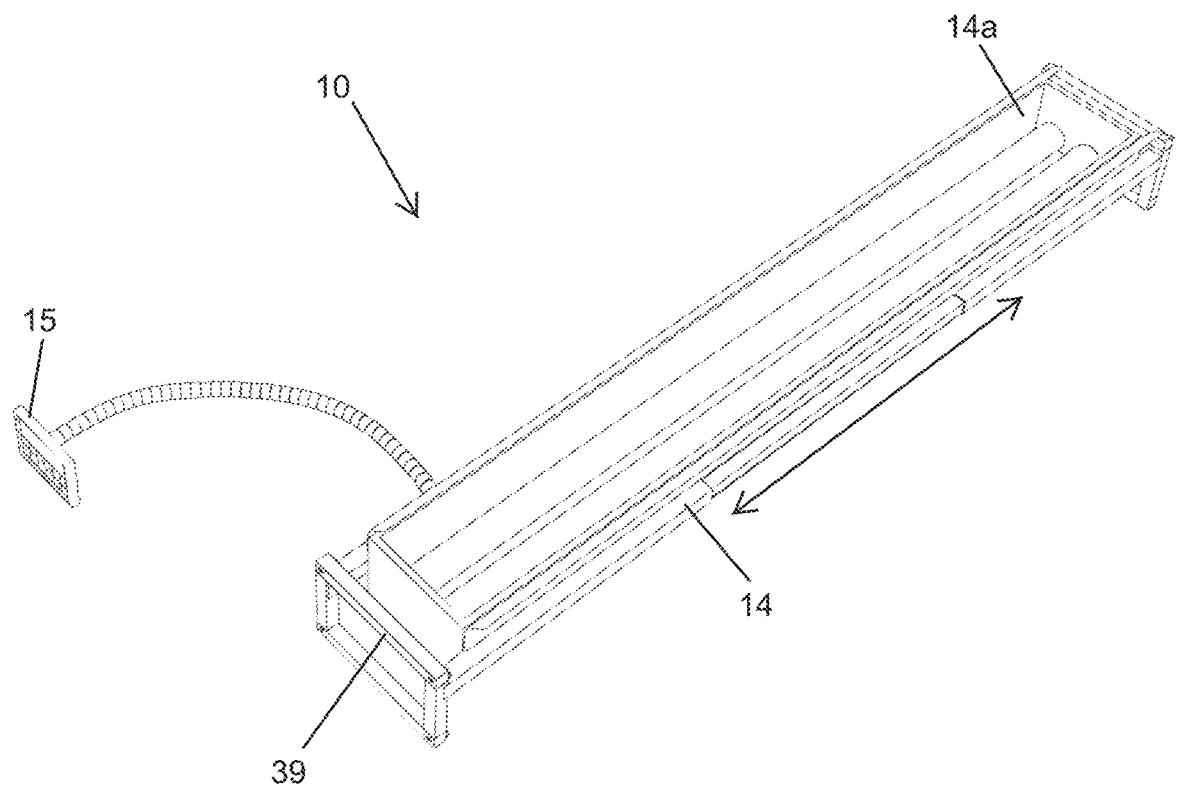
FIG. 3 is a perspective view illustrating the conveyor belt sanitizer system according to an embodiment of the present disclosure.
Figure 4:
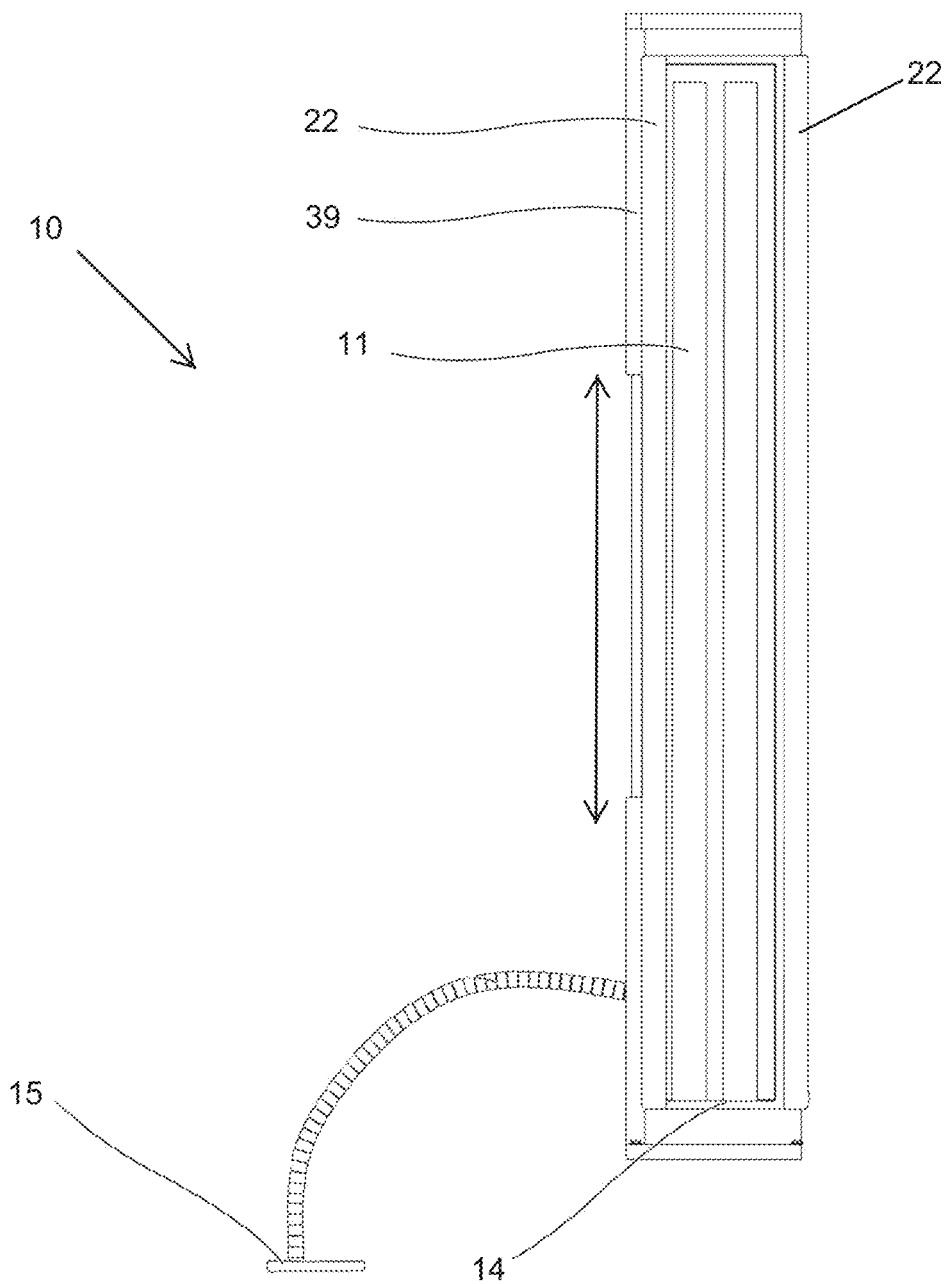
FIG. 4 is a top view of the conveyor belt sanitizer system according to an embodiment of the present disclosure.
Figure 5:
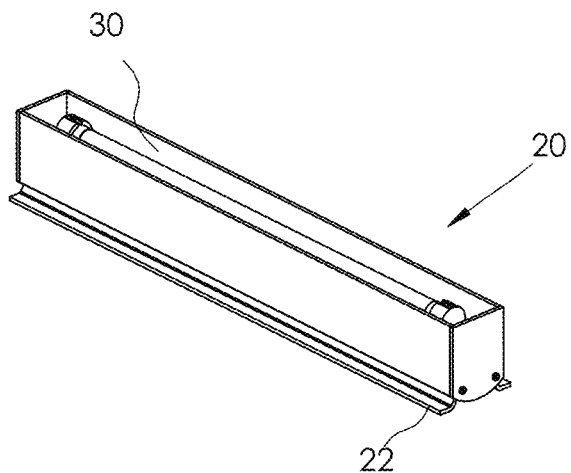
FIG. 5 is a perspective view of the conveyor belt sanitizer system according to another embodiment of the present disclosure.
Figure 5A:
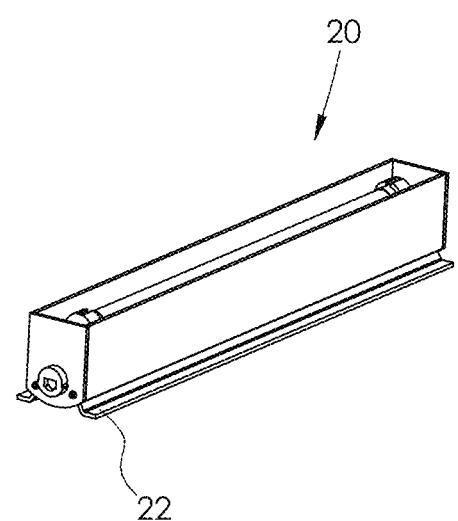
FIG. 5a is another perspective view of the conveyor belt sanitizer system shown in FIG. 5.
Figure 6:
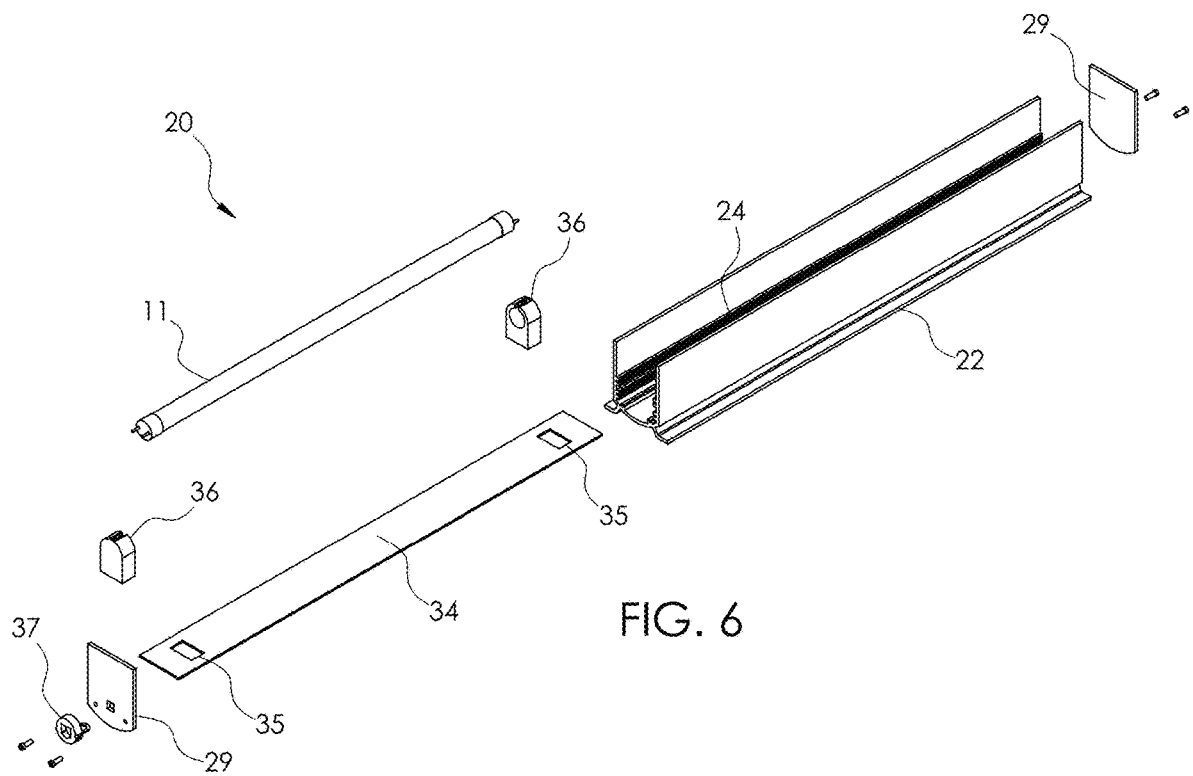
FIG. 6 is an exploded view of the conveyor belt sanitizer system shown in FIG. 5.
Figure 7:
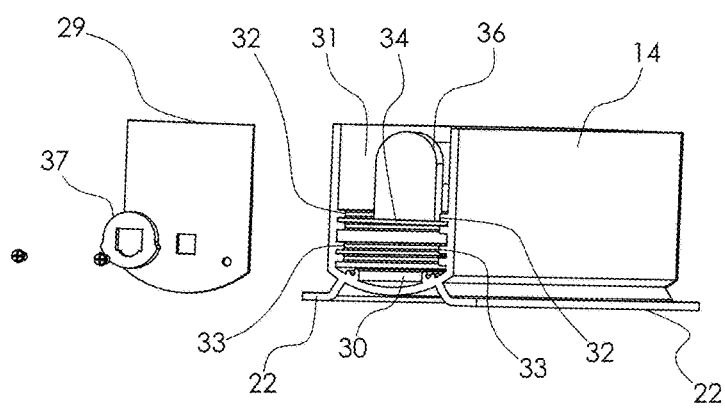
FIG. 7 is an enlarged perspective view showing an end portion removed from the housing shown in FIG. 6.
Figure 8:
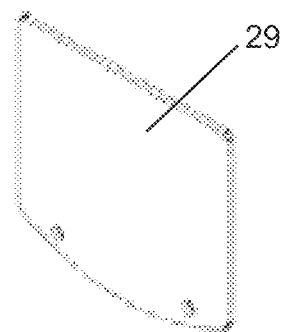
FIG. 8 is an enlarged perspective view of the end cap shown in FIG. 7.
Figure 9:
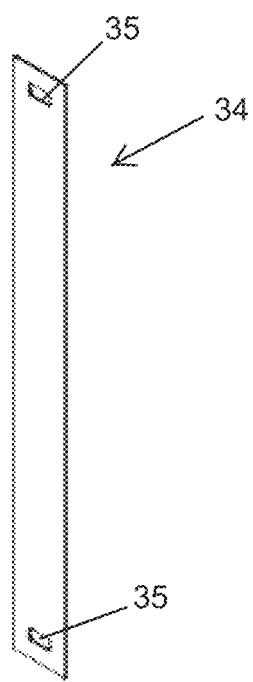
FIG. 9 is an enlarged perspective view of the panel shown in FIG. 7.
Figure 10:
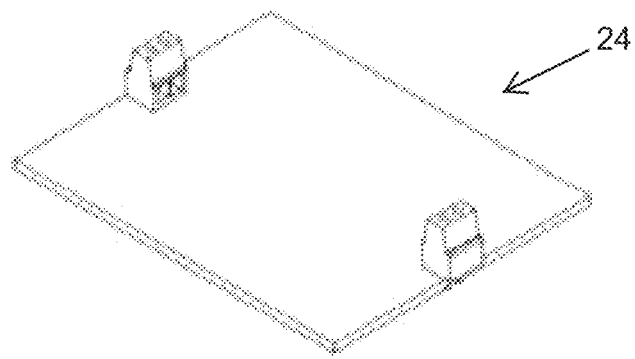
FIG. 10 is a perspective view of a PC board.
Figure 11:
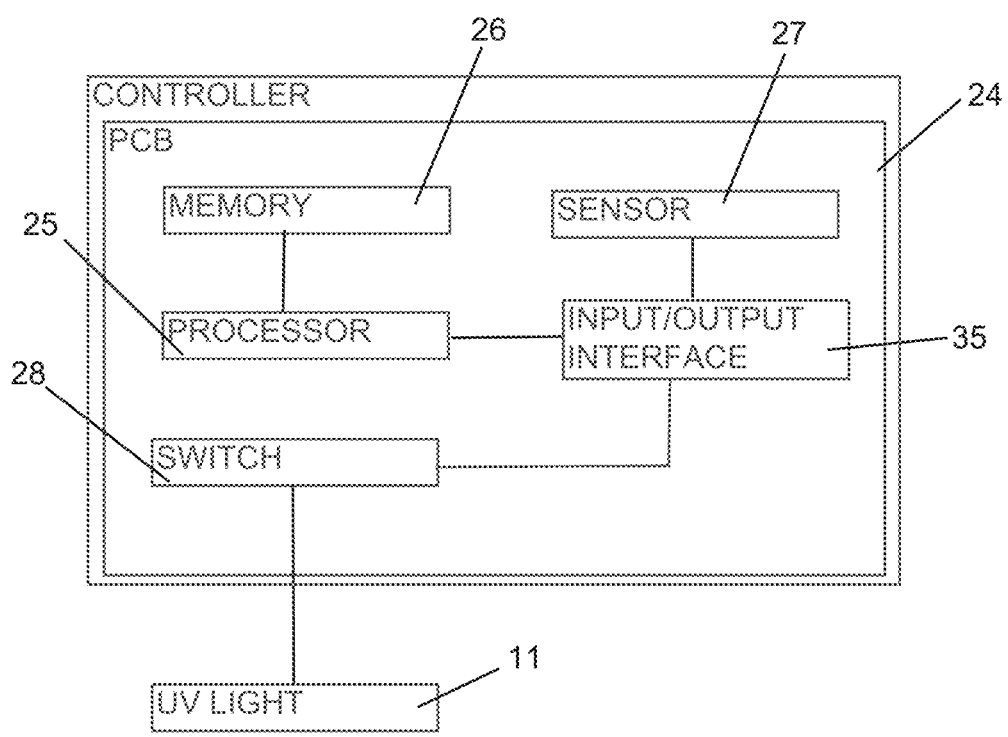
FIG. 11 is a schematic block diagram illustrating the interrelationship between the major electronic components of the present disclosure, according to an embodiment of the present disclosure.
Figure 12:
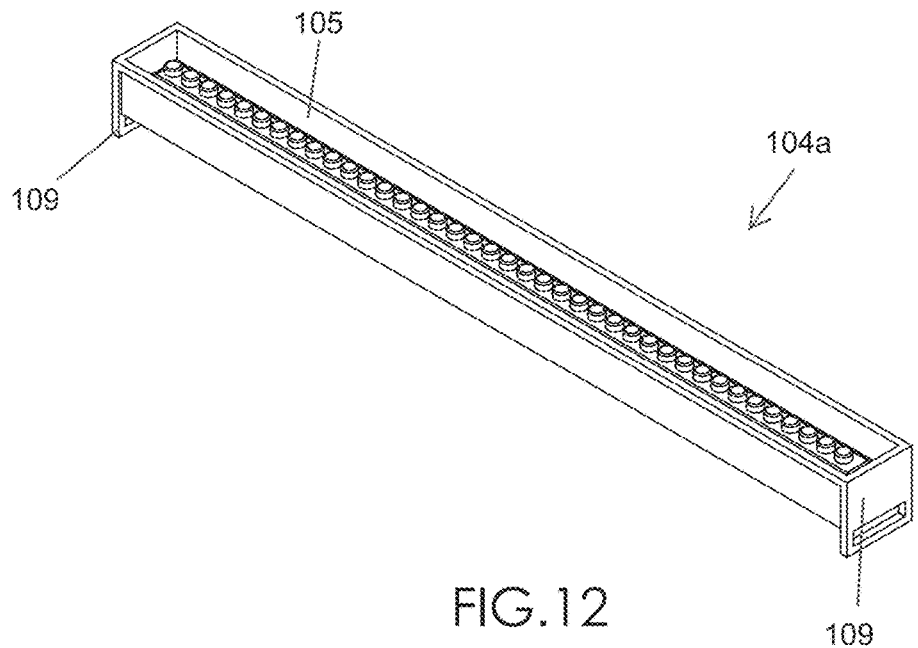
FIG. 12 is a perspective view of a first opaque case having LEDs, according to an embodiment of the present disclosure.
Figure 13:
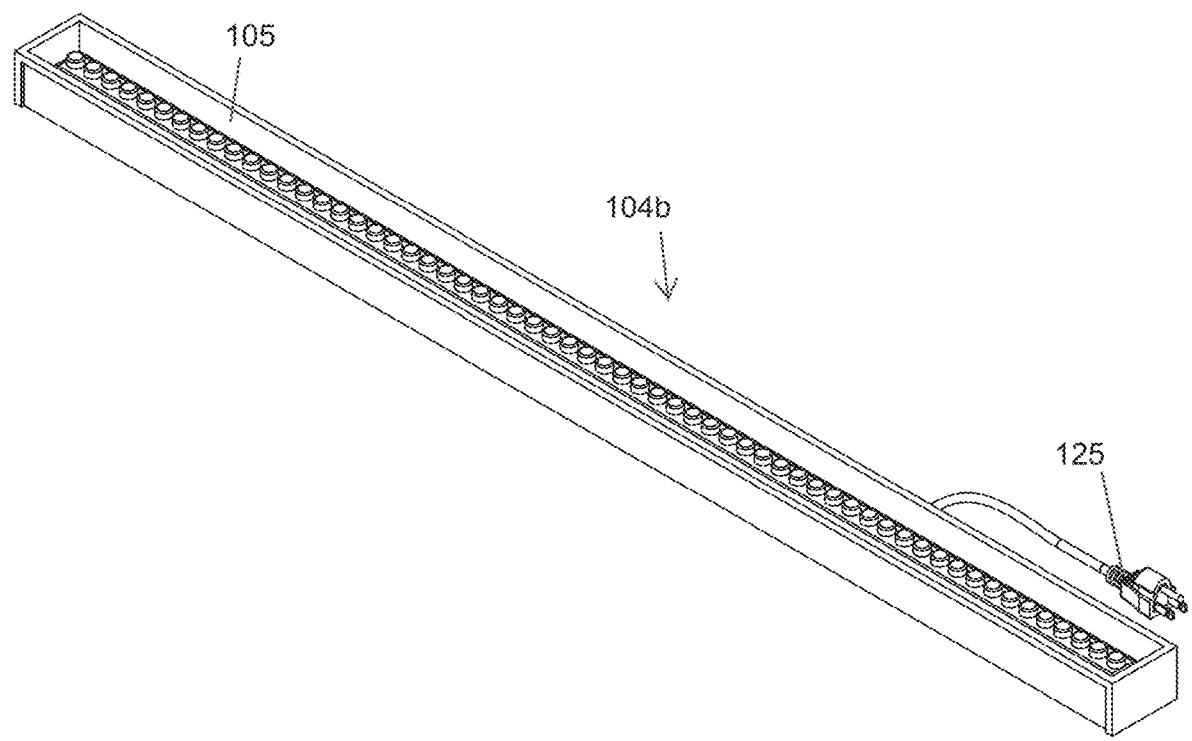
FIG. 13 is a perspective view of a second opaque case having LEDs, according to an embodiment of the present disclosure.
Figure 14:
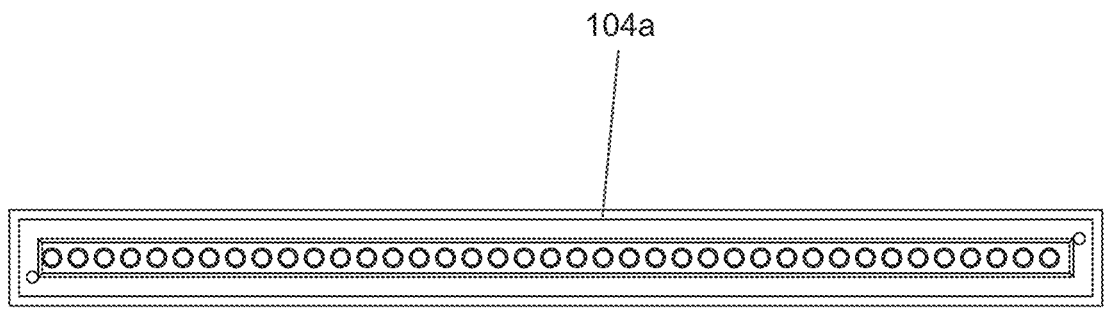
FIG. 14 is a top plan view of the first opaque case having LEDs shown in FIG. 12, according to another embodiment of the present disclosure.
Figure 15:
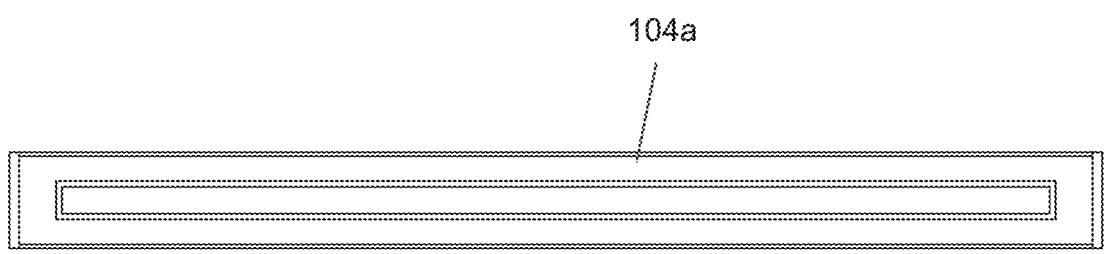
FIG. 15 is a bottom plan view of the first opaque case having LEDs shown in FIG. 12, according to another embodiment of the present disclosure.
Figure 16A:
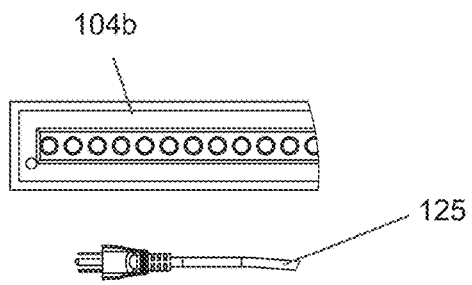
FIG. 16a is an enlarged partial view of the second opaque case having LEDs shown in FIG. 13, according to another embodiment of the present disclosure.
Figure 16:
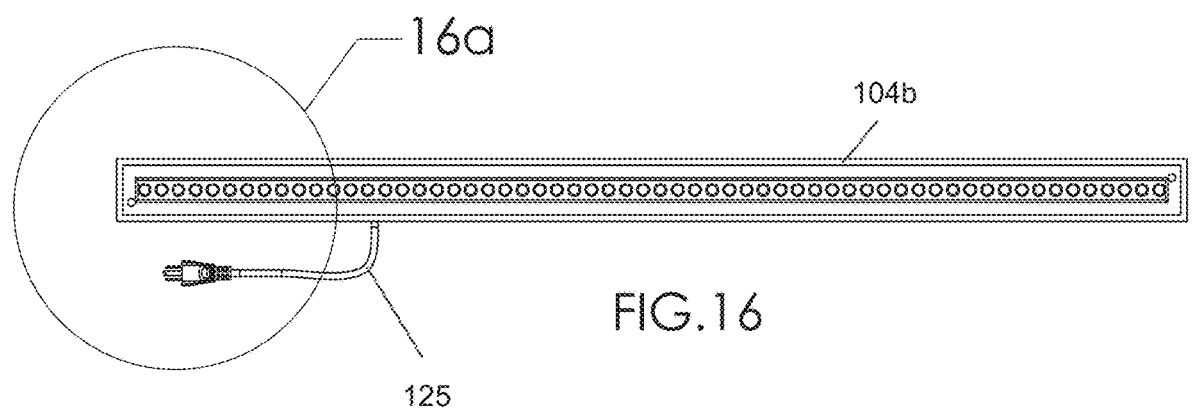
FIG. 16 is a top plan view of the second opaque case having LEDs shown in FIG. 13, according to another embodiment of the present disclosure.
Figure 17:
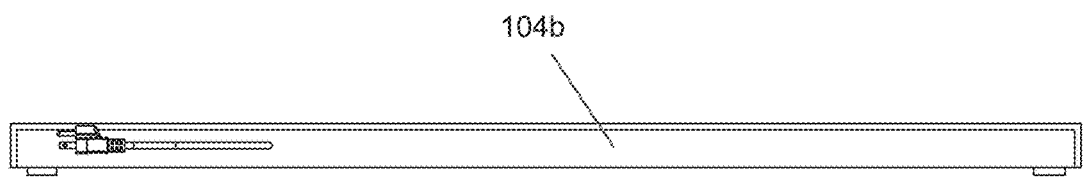
FIG. 17 is a side elevational view of the second opaque case having LEDs shown in FIG. 13, according to another embodiment of the present disclosure.
Figure 18:
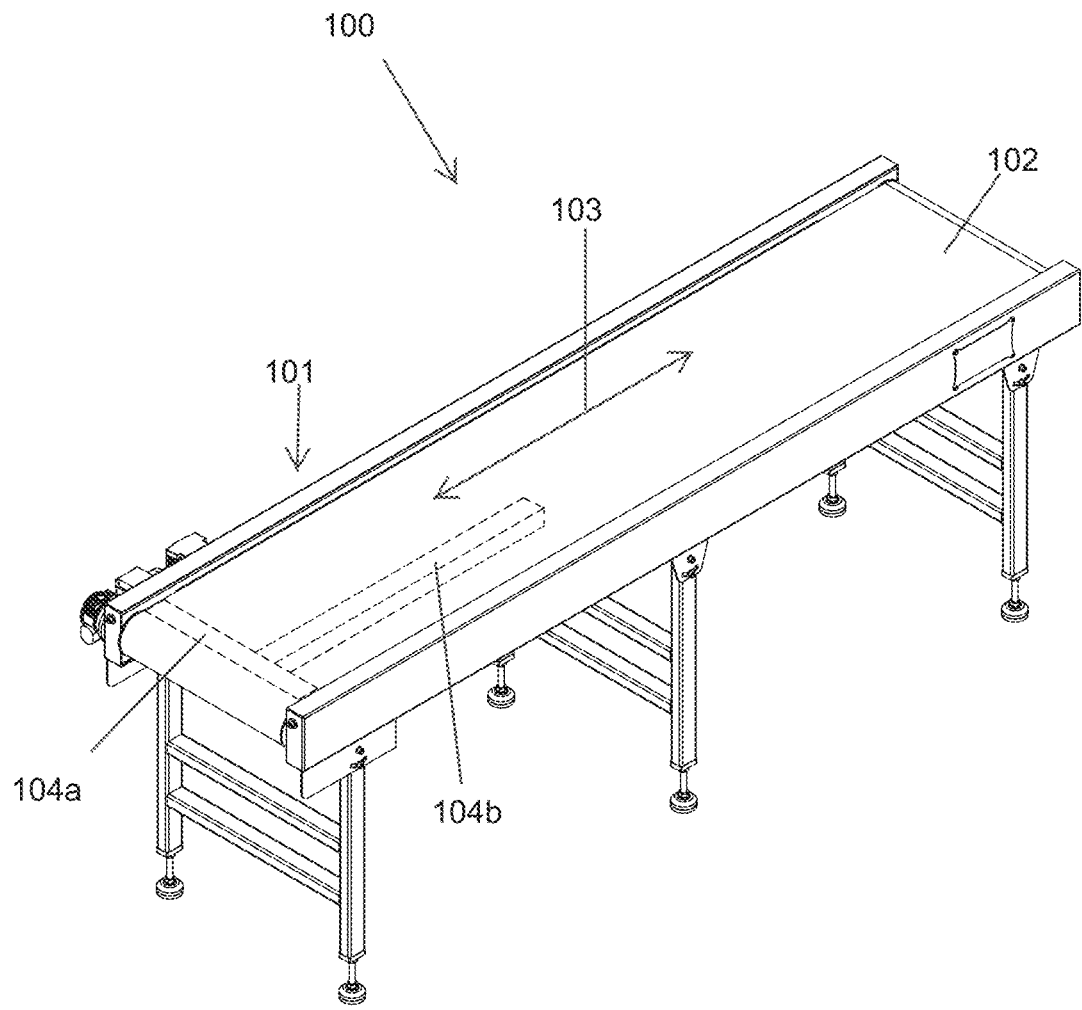
FIG. 18 is a perspective view of the conveyor belt sanitizing system, according to another embodiment of the present disclosure.
Figure 19:
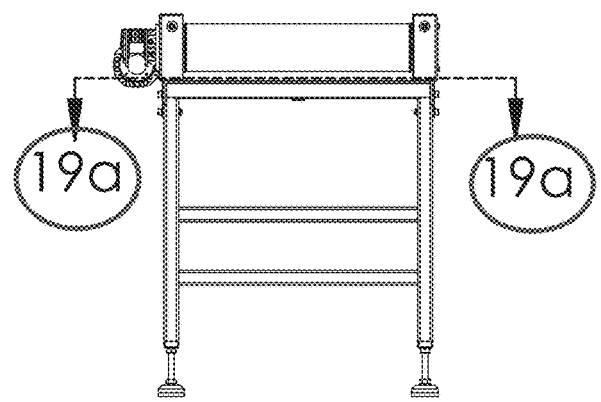
FIG. 19 is a front elevational view of the conveyor belt sanitizing system, according to another embodiment of the present disclosure.
Figure 19A:
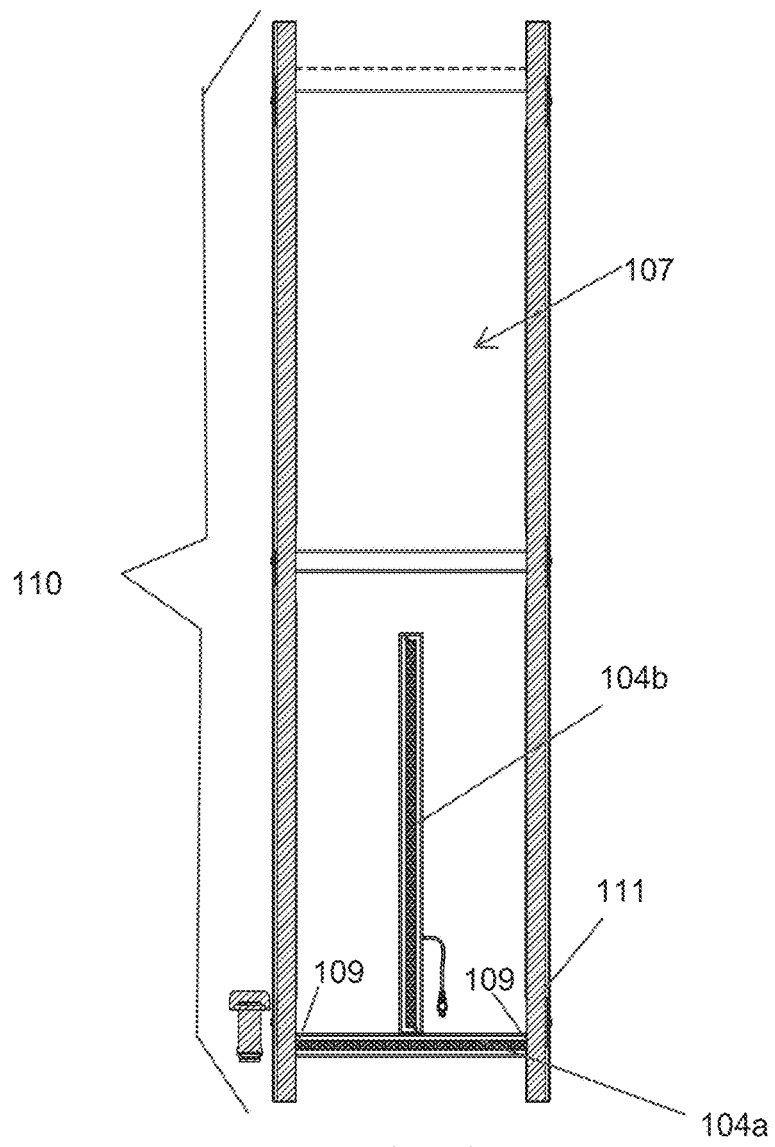
FIG. 19a is a cross-sectional view taken along line 19a-19a in FIG. 19, according to another embodiment of the present disclosure.
Figure 20:
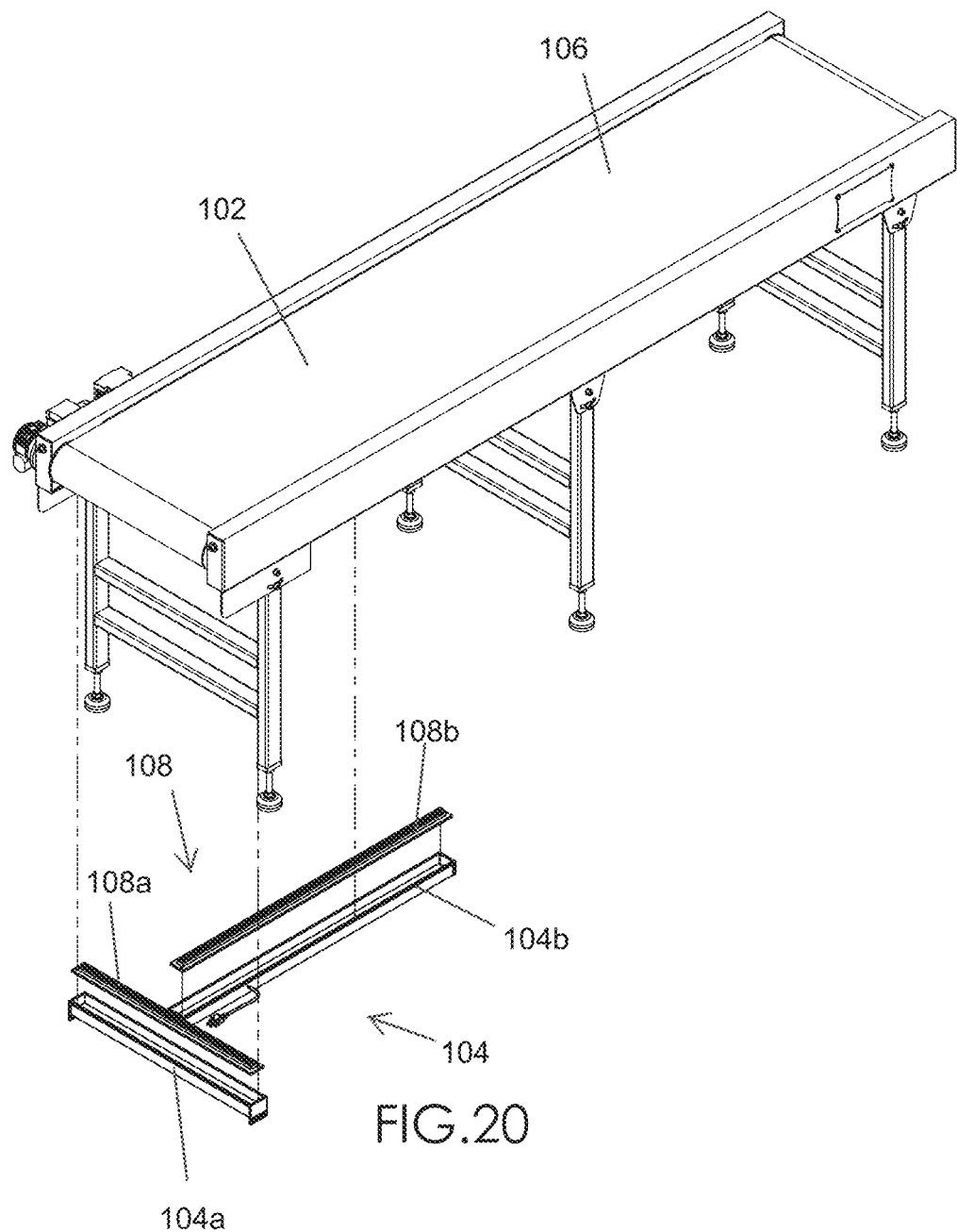
FIG. 20 is an exploded view of the conveyor belt sanitizing system, according to another embodiment of the present disclosure.
Figure 21:
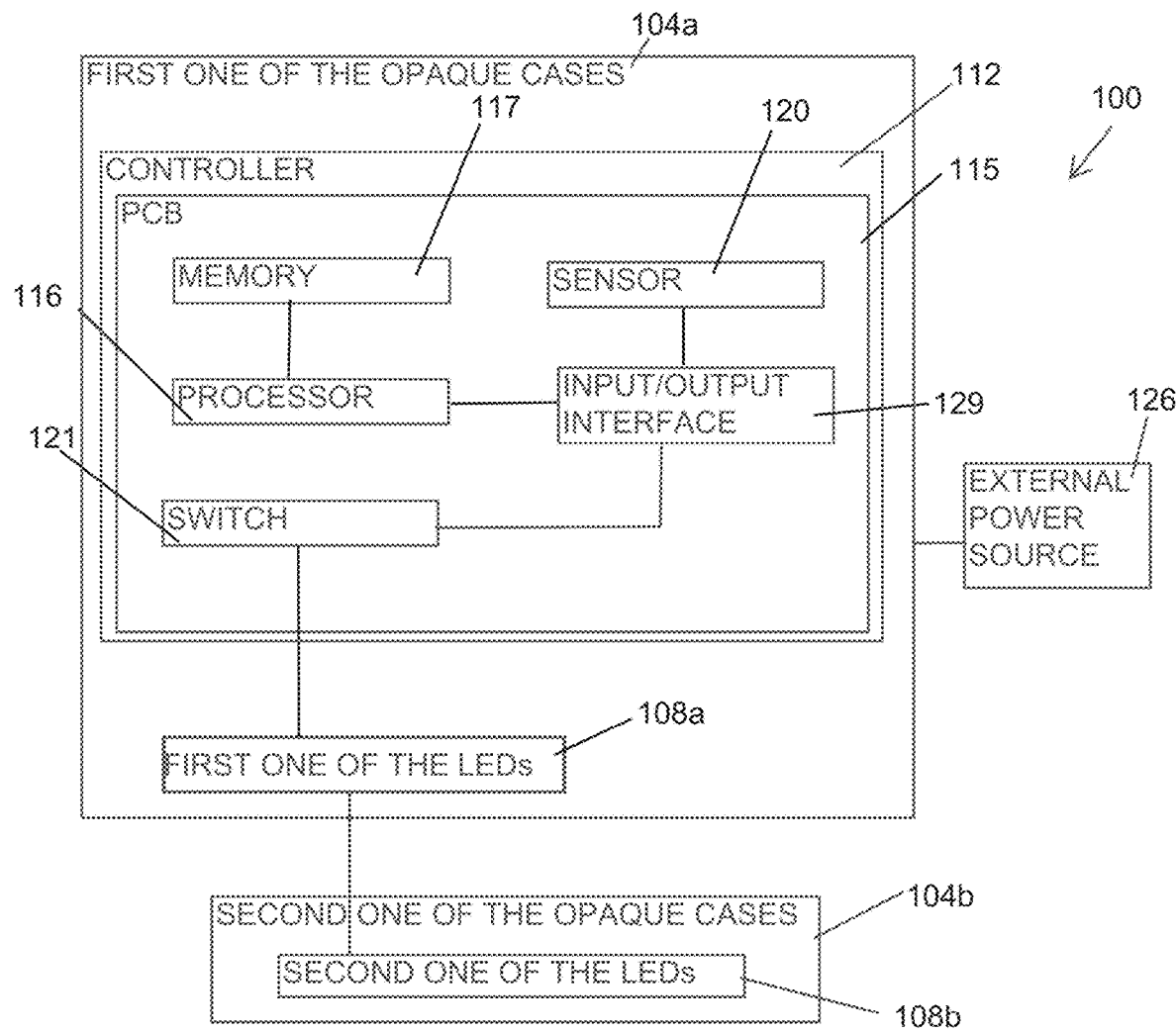
FIG. 21 is a schematic block diagram illustrating the interrelationship between the major electronic components of the present disclosure, according to the embodiment of FIG. 18.

The non-limiting exemplary embodiment(s) is/are referred to generally in FIGS. 1-21 and is/are intended to provide a conveyor belt sanitizer system 10. It should be understood that the exemplary embodiment(s) may be used to kill bacteria and viruses on conveyor belts 21, typically found in grocery stores, and should not be limited to any particular conveyor belt sanitizer system 10 described herein.

The conveyor belt sanitizer system 10 includes a cleaning device 20 including an opaque case 14 having an open top side 14a disposed proximate to and facing an outer surface of an existing conveyor belt 21, at least one ultra-violet (UV) light 11 situated in the opaque case 14 at the open top side 14a, at least one squeegee blade 22 connected to opposed longitudinal sides of the opaque case 14 and configured to be mounted to a support surface (e.g., conveyor belt frame), and a controller 15 operably coupled to the at least one UV light 11. Advantageously, the controller 15 is configured to automatically actuate the at least one UV light 11 between an operating mode and a non-operating mode when the existing conveyor belt 21 is rotated relative to a stationary position of the opaque case 14 and further configured to selectively sanitize an outer surface of the existing conveyor belt 21 via the open top side 14a of the opaque case 14. Advantageously, the opaque case 14 is portable and configured to be repeatedly detached from the outer surface of the existing conveyor belt 21. Advantageously, the controller 15 is configured to be programmed to operate a predetermined time interval after the existing conveyor belt 21 has stopped rotating relative to the opaque case 14. Such a structural configuration yields the new, useful, and unpredicted result of cleaning the entire surface area of the conveyor belt 21 by solving the problem of inadvertently not wiping or spraying the entire surface area with a liquid disinfectant. The UV light 11 emits blue light that covers the entire surface area of the conveyor belt 21.

In a non-limiting exemplary embodiment, the opaque case 14 has a telescopically expandable bracket 39.

In a non-limiting exemplary embodiment, the controller 15 includes a printed circuit board (PCB 24) seated entirely within the opaque case 14 and including a processor 25, and a memory 26 in communication with the processor 25. The memory 26 includes software instructions, executable by the processor 25, for controlling an operating mode of the UV light 11. The PCB 24 further includes at least one sensor 27 in communication with the processor 25 for detecting motion of the existing conveyor belt 21, and a switch 28 in communication with the processor 25 and for controlling operation of the UV light 11. An input/output interface 35 facilitates communication between the processor 25, switch 28, and sensor 27. For example, the UV lights 11 may operate at low, medium, or high output levels and may operate for a predetermined time interval (e.g., 1-2 minutes or longer) after the conveyor belt 21 stops rotating. Such a structural configuration yields the new, useful, and unpredicted result of ensuring the UV light 11 is turned on when the conveyor belt 21 rotates by solving the problem of forgetting to manually wipe the conveyor belt 21 as it rotates.

In a non-limiting exemplary embodiment, the opaque case 14 further includes a pair of end caps 29, a U-shaped cross-section, and a hollow cavity 30 situated between the pair of end caps 29. Such a structural configuration yields the new, useful, and unpredicted result of enabling a user to quickly replace the UV light 11 by solving the problem of having to use tools to access the UV light 11.

In a non-limiting exemplary embodiment, the at least one squeegee blade 22 includes a first squeegee blade 22 and a second squeegee blade 22 each having a curvilinear cross-section and being attached directly to a closed bottom side of the opaque case 14 opposite to the open top side 14a. Advantageously, each of the end caps 29 are abutted against the first squeegee blade 22 and the second squeegee blade 22. In this manner, each of the first squeegee blade 22 and a second squeegee blade 22 is disposed entirely exterior of the opaque case 14. Such a structural configuration yields the new, useful, and unpredicted result of enabling the opaque case 14 to be mounted subjacent to a variety of support surfaces in space-limited zones near a conveyor belt 21, as well as keeping the UV light 11 out of a human's line of sight.

In a non-limiting exemplary embodiment, the opaque case 14 further includes an interior surface 31 including a first pair of horizontally opposed channels 32 and a second pair of horizontally opposed channels 33 aligned subjacent thereto, respectively. Such a structural configuration yields the new, useful, and unpredicted result of enabling quick and succinct access to both the PCB 24 and support panel 34 by solving the problem of having to disassemble the opaque housing to access such items.

In a non-limiting exemplary embodiment, the opaque case 14 further includes a planar support panel 34 having opposed rectilinear longitudinal sides and a pair of apertures 35 disposed at axially opposed proximal and distal ends thereof. Advantageously, the planar support panel 34 is slidably interfitted along the first pair of horizontally opposed channels 32 and entirely contained within the opaque case 14. Such a structural configuration yields the new, useful, and unpredicted result of enabling the UV light 11 to be easily accessed and removed by solving the problem of limited access to the opaque case 14 in space-limited zones.

In a non-limiting exemplary embodiment, the PCB 24 is slidably interfitted along the second pair of horizontally opposed channels 33 and entirely contained within the opaque case 14. Advantageously, the PCB 24 is disposed parallel and subjacent to the planar support panel 34. Such a structural configuration yields the new, useful, and unpredicted result of enabling a user to replace the PCB 24 and support panel quickly and succinctly 34 by solving the problem of having to disassemble the opaque case 14 to access such items.

In a non-limiting exemplary embodiment, the opaque case 14 further includes a pair of electrical sockets 36 mounted to the pair of apertures 35 respectively. Advantageously, the UV light 11 has opposite terminals removably and operably connected to the pair of electrical sockets 36, respectively. Such a structural configuration yields the new, useful, and unpredicted result of enabling a user to replace the UV light 11 quickly and succinctly by solving the problem of having to disassemble the opaque case 14.

In a non-limiting exemplary embodiment, the opaque case 14 further includes a pair of power cord strain reliefs 37 attached to the pair of end caps 29 for guiding a power cord towards the UV light 11. Such a structural configuration yields the new, useful, and unpredicted result of enabling a user to unplug the power cable and transport the opaque case 14 to another location quickly and succinctly.

The present disclosure further includes a method of utilizing a conveyor belt sanitizer system 10. Such a method includes the chronological steps of: accessing an existing conveyor belt 21; and providing a conveyor belt sanitizer system 10 including a cleaning device 20 having a portable opaque case 14 provided with an open top side 14a, at least one ultra-violet (UV) light situated in the opaque case 14 at the open top side 14a, at least one squeegee blade 22 connected to opposed longitudinal sides of the opaque case 14 and configured to be mounted to a support surface (e.g., conveyor belt frame), and a controller 15 operably coupled to the at least one UV light 11. Such method steps yield the new, useful, and unpredicted result of cleaning the entire surface area of the conveyor belt 21 by solving the problem of inadvertently not wiping or spraying the entire surface area with a liquid disinfectant. The UV light 11 emits blue light that covers the entire surface area of the conveyor belt 21.

The method further includes the steps of: disposing the open top side 14a of the opaque case 14 proximate to and facing an outer surface of the existing conveyor belt 21; configuring the controller 15 to automatically actuate the at least one UV light 11 between an operating mode and a non-operating mode when the existing conveyor belt 21 is rotated relative to a stationary position of the opaque case 14 and further configuring the controller 15 to selectively sanitize an outer surface of the existing conveyor belt 21 via the open top side 14a of the opaque case 14; programming the controller 15 to operate a predetermined time interval after the existing conveyor belt 21 has stopped rotating relative to the opaque case 14; and repeatedly detaching the opaque case 14 from the outer surface of the existing conveyor belt 21. Such method steps yield the new, useful, and unpredicted result of cleaning the entire surface area of the conveyor belt 21 by solving the problem of inadvertently not wiping or spraying the entire surface area with a liquid disinfectant. The UV light 11 emits blue light that covers the entire surface area of the conveyor belt 21.

Referring to FIGS. 1-11 in general, in a non-limiting exemplary embodiment(s), the conveyor belt sanitizer system 10 includes cleaning device 20 configured to clean and sanitize a conveyor belt 21 by utilizing UV light 11 rays. The cleaning device 20 includes an expandable frame (case 14) and is mountable to a conveyor belt system 10 area. The cleaning device 20 includes UV lights 11 housed within a lightproof UV case 14. The lightproof UV case 14 directs UV light 11 towards a host conveyor belt 21 and prevents UV light 11 rays from being directed elsewhere. Additionally, rubber squeegee blades 22 bend against the conveyor belt 21 to prevent UV light 11 rays from being directed elsewhere. The UV light 11 rays emitted from the UV light 11 are used to eliminate harmful bacteria and viruses found on an outer surface of a conveyor belt 21 on a conveyor belt system.

The cleaning device 20 is configured to clean an outer surface of the conveyor belt 21 as the conveyor belt 21 is rotated. As shown in FIGS. 1-11, the cleaning device 20 is connected to and controlled by an LCD control panel (controller 15). The controller 15 may be mounted on a surface near the conveyor belt 21. The LCD controller 15 may be connected to the lightproof UV case 14 by a cable 37. The cable is preferably concealed by a panel cable sheath.

The UV light 11 of the cleaning device 20 are configured to activate when a conveyor belt 21 is rotating in order to sanitize the conveyor belt 21 as it passes the UV light 11. Additionally, the controller 15 of the conveyor belt sanitizer system 10 may include a feature to activate the conveyor belt 21 in set intervals when not normally used such that the conveyor belt 21 can turn slower and receive a deeper clean. The device may be provided in a variety of different sizes and shapes to accommodate the main types of conveyor belts 21.

Referring to FIGS. 12-21, a conveyor belt sanitizer system 100 includes a free-standing conveyor belt apparatus 101 having a rotating conveyor belt 102 traveling in a looped path 103, a plurality of opaque cases 104 having an open top side 105 disposed proximate to and facing an outer surface 106 of the conveyor belt 102 along a hidden return section 107 of the looped path 103, a plurality of light-emitting diode strips (LEDs 108) situated in the plurality of opaque cases 104 at the open top side 105, a plurality of brackets 109 connected to opposed ends of a first one 104a of the plurality of opaque cases 104 and configured to be mounted to a support surface 111 at the hidden return section 107 of the looped path 103, and a controller 112 coupled to the plurality of LEDs 108. Advantageously, a first one 104a of the plurality of LEDs 108 and the first one 104a of the plurality of opaque cases 104 is statically disposed beneath the rotating conveyor belt 102 and oriented perpendicular to a longitudinal length 110 of the hidden return section 107 of the looped path 103. Advantageously, a second one 108b of the plurality of LEDs 108 and a second one 104b of the plurality of opaque cases 104 is statically disposed beneath the rotating conveyor belt 102 and oriented parallel to the longitudinal length 110 of the hidden return section 107 of the looped path 103. Advantageously, the controller 112 is configured to automatically actuate the plurality of LEDs 108 between an operating mode and a non-operating mode when the conveyor belt 102 is rotated relative to a stationary position of the plurality of opaque cases 104 and further configured to selectively sanitize an outer surface 106 of the conveyor belt 102 via the open top side 105 of the plurality of opaque cases 104. Advantageously, the first one 104a of the plurality of opaque cases 104 is disposed orthogonal to the second one 104b of the plurality of opaque cases 104.

In a non-limiting exemplary embodiment, each LED 108 may include approximately 60 individual LED lights, which may be approximately ½inch×½ inch×18 inches long. Each LED 108 may be adhesively or magnetically affixed to its associated opaque case 104. The LEDs 108 may be ultra-violet light-emitting diodes emitting a wavelength of approximately 207-227 nanometers.

In a non-limiting exemplary embodiment, the controller 112 is seated entirely within the first one 104a of the opaque cases 104 and includes a printed circuit board (PCB 115) seated entirely within the controller 112 and including a processor 116, and a memory 117 in communication with the processor 116. Such a memory 117 includes software instructions, executable by the processor 116, for controlling an operating mode of the plurality of LEDs 108 in each of the plurality of opaque cases 104. Advantageously, at least one sensor 120 is in communication with the processor 116 for detecting motion of the existing conveyor belt 102, and a switch 121 is in communication with the processor 116 and for controlling operation of the plurality of LEDs 108 in each of the plurality of opaque cases 104. An input/output interface 129 links the switch 121 to the sensor 120. Thus, when the sensor 120 detects motion of the conveyor belt 102, the LEDs 108 turn on, and when no motion is detected, the LEDs 108 turn off.

In a non-limiting exemplary embodiment, each of the plurality of opaque cases 104 further includes a U-shaped cross-section and a hollow cavity 122. The LEDs 108 are seated within the hollow cavity 122.

In a non-limiting exemplary embodiment, the plurality of brackets 109 are attached to opposed axial ends of the first one 104a of the plurality of the opaque cases 104 and spaced from the second one 104b of the plurality of opaque cases 104. Advantageously, the second one 104b of the plurality of opaque cases 104 is detachably and operably attached to the first one 104a of the plurality of opaque cases 104 for receiving power in series. For example, a conductive terminal in each opaque case 104 may be electrically and detachably connected to each other.

In a non-limiting exemplary embodiment, the second one 104b of the plurality of opaque cases 104 further includes a power cord 125 operably attached to an external power source 126.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A conveyor belt sanitizer system comprising:
   a free-standing conveyor belt apparatus having a rotating conveyor belt traveling in a looped path;
   a plurality of opaque cases having an open top side disposed proximate to and facing an outer surface of said conveyor belt along a hidden return section of said looped path;
   a plurality of light-emitting diode strips (LEDs) situated in said plurality of opaque cases at said open top side;
   a plurality of brackets connected to opposed ends of a first one of said plurality of opaque cases and configured to be mounted to a support surface at said hidden return section of said looped path; and
   a controller coupled to said plurality of LEDs;
   wherein a first one of said plurality of LEDs and said first one of said plurality of opaque cases is statically disposed beneath said rotating conveyor belt and oriented perpendicular to a longitudinal length of said hidden return section of said looped path;
   wherein a second one of said plurality of LEDs and a second one of said plurality of opaque cases is statically disposed beneath said rotating conveyor belt and oriented parallel to the longitudinal length of said hidden return section of said looped path;
   wherein said controller is configured to automatically actuate said plurality of LEDs between an operating mode and a non-operating mode when said conveyor belt is rotated relative to a stationary position of said plurality of opaque cases and further configured to selectively sanitize an outer surface of said conveyor belt via said open top side of said plurality of opaque cases;
   wherein said first one of said plurality of opaque cases is disposed orthogonal to said second one of said plurality of opaque cases.

2. The conveyor belt sanitizer system of claim 1, wherein said controller is seated entirely within said first one of said opaque cases and comprises: a printed circuit board (PCB) seated entirely within said controller and including
   a processor;
   a memory in communication with said processor, said memory including software instructions, executable by said processor, for controlling an operating mode of said plurality of LEDs in each of said plurality of opaque cases;
   at least one sensor in communication with said processor for detecting motion of the existing conveyor belt; and a switch in communication with said processor and for controlling operation of said plurality of LEDs in each of said plurality of opaque cases.

3. The conveyor belt sanitizer system of claim 2, wherein each of said plurality of opaque cases further comprises: a U-shaped cross-section and a hollow cavity.

4. The conveyor belt sanitizer system of claim 3, wherein said plurality of brackets are attached to opposed axial ends of said first one of said plurality of said opaque cases and spaced from said second one of said plurality of opaque cases, wherein said second one of said plurality of opaque cases is detachably and operably attached to said first one of said plurality of opaque cases.

5. The conveyor belt sanitizer system of claim 4, wherein said second one of said plurality of opaque cases further comprises: a power cord operably attached to an external power source.

\* \* \* \* \*